(12) United States Patent
Ou et al.

(10) Patent No.: US 8,308,581 B2
(45) Date of Patent: Nov. 13, 2012

(54) WATER REPELLENT GOLF CLUB LEATHER GRIP AND MANUFACTURING METHOD THEREOF

(76) Inventors: Chien-Kuo Ou, Chang Hua (TW); Hong-Sung Chu, Alhambra, CA (US)

( * ) Notice: Subject to any disclaimer, the term of this patent is extended or adjusted under 35 U.S.C. 154(b) by 343 days.

(21) Appl. No.: 12/799,963

(22) Filed: May 5, 2010

(65) Prior Publication Data
US 2011/0275450 A1      Nov. 10, 2011

(51) Int. Cl.
*A63B 53/14* (2006.01)
(52) U.S. Cl. ...................................................... 473/300
(58) Field of Classification Search ........... 473/300–303
See application file for complete search history.

(56) References Cited

U.S. PATENT DOCUMENTS

| | | | |
|---|---|---|---|
| 3,311,375 A | 3/1967 | Onions | |
| 3,366,384 A | 1/1968 | Lamkin et al. | |
| 3,857,745 A | 12/1974 | Graush et al. | |
| 4,346,890 A * | 8/1982 | Kaminstein | 473/537 |
| 5,695,418 A | 12/1997 | Huang | |
| 6,857,971 B2 | 2/2005 | Huang | |
| 6,908,400 B2 * | 6/2005 | Chu et al. | 473/303 |
| 6,953,621 B2 * | 10/2005 | Schaefer | 428/305.5 |
| 7,347,792 B2 | 3/2008 | Huang | |
| 7,404,770 B2 | 7/2008 | Huang | |
| 7,470,199 B2 | 12/2008 | Huang | |
| 7,491,133 B2 | 2/2009 | Huang | |
| 7,527,564 B2 | 5/2009 | Huang | |
| 2003/0216192 A1 * | 11/2003 | Chu | 473/300 |
| 2006/0027313 A1 * | 2/2006 | Jaw | 156/213 |
| 2009/0025852 A1 | 1/2009 | Huang | |
| 2009/0258721 A1 | 10/2009 | Huang | |

OTHER PUBLICATIONS

U.S. Appl. No. 12/590,506, Hong-Sung Chu et al., filed Nov. 9, 2009, now pending and its preliminary amendment A.

* cited by examiner

*Primary Examiner* — Stephen L. Blau (57) ABSTRACT

A golf club grip having an outer leather layer that includes a low water absorption leather and a polymeric protection coat. The low water absorption leather has a static water absorption range from about 30% by weight to 20% by weight after completely immersed in water for one hour and a range from 45% by weight to 35% by weight after completely immersed in water for six hours in the test method according to ASTM D6015. The protection coat is bonded to a grain surface of the low water absorption leather to retard the penetration of water and to protect the leather from damages. The outer leather layer is configured either as a single sheet or as a strip, wrapped and adhered onto a lining sleeve to cover a sleeve body of the lining sleeve to form a water repellent leather grip.

22 Claims, 14 Drawing Sheets

WATER REPELLENT GOLF CLUB LEATHER GRIP AND MANUFACTURING METHOD THEREOF

CROSS-REFERENCE TO RELATED APPLICATION

Not Applicable.

BACKGROUND OF THE INVENTION

1. Field of the Invention

The invention relates to a golf club grip and manufacturing method thereof, and more particularly to a natural leather golf club grip that does not become slick and hard after being in wet conditions, is easy to clean and maintain, mildew resistant, cost efficient, and has decreased defective rate during manufacturing process.

2. Description of the Related Art

For hundreds of years, strip leather has been used for golf club grip material. In the usage of golf club grip, the strip leather grips were costly, difficult to wind properly, easy to unravel, became slick and hard after being in wet conditions, hard to clean and maintain, and susceptible to mildew. Through the 1950s, these drawbacks might have been some of the reasons why rubber mold grip have took over the strip leather golf club grip's market share and became popular.

Figure 1:
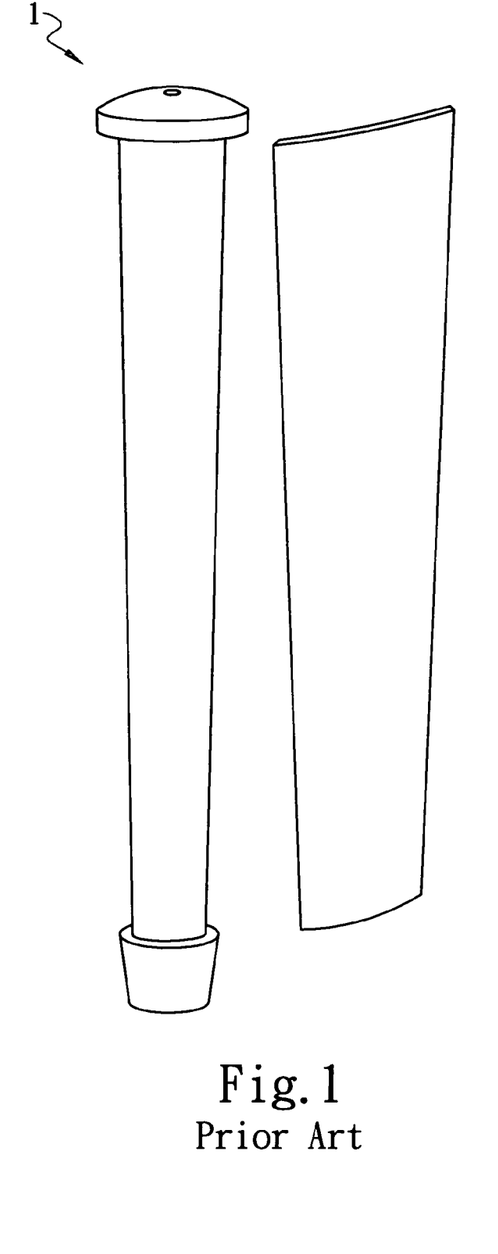
FIG. 1 is an exploded view of the single sheet golf club grip in a prior art.
Figure 2:
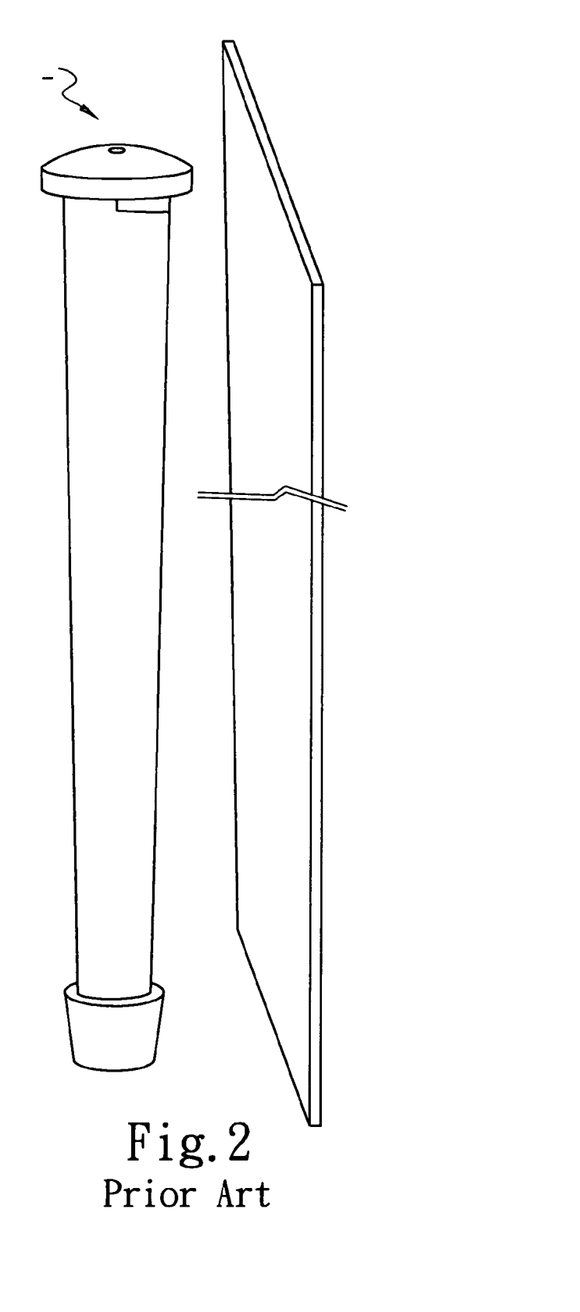
FIG. 2 is an exploded view of the spiral strip golf club grip in another prior art.

Referring to the prior art 1967 U.S. Pat. No. 3,338,175 Onions, a multi-layer leather golf club grip that has an inner lining sleeve to receive the larger end of the golf club shaft and an outer leather layer wrapped and adhered onto the inner lining sleeve is disclosed. Further referring to FIGS. 1 and 2, this outer leather layer can either be a spirally wrapped strip layer or a sheet layer. Because of the outer sheet layer's shape, the single sheet leather golf club grip 1 in a prior art does not have the winding and the unravelling problems of the strip leather golf club grip 2 in another prior art. The Applicant Hong-Sung Chu developed an axial seam structure strong enough to hold the single natural leather sheet's two axial margins together, to decrease the defective rate in production, and to enhance the expansion capacity of the grips in an effort to not only ease installation but also to increase the maximum grip size attainable (U.S. patent application Ser. No. 12/590,506, filed Nov. 9, 2009). Yet, the conventional multi-layer leather golf club grips 1, 2 still have other drawbacks, namely: cost, becoming slick and hard after being in wet conditions, hard to clean and maintain, and susceptibility to mildew.

SUMMARY OF THE INVENTION

The Applicants have developed an improved multi-layer leather golf club grip to solve the problems mentioned above.

It is the present invention's main object to provide a leather grip that is cost efficient, not easily becoming slick and hard after being in wet condition, easy to clean and maintain, mildew resistant, and with a decreased defective product rate in production.

According to this aspect of the invention, the leather grip comprises an outer leather layer and a lining sleeve as an inner layer. The outer leather layer comprises a low water absorption leather which has a static water absorption range from 30% by weight to 20% by weight, preferably 26% by weight after completely immersed in water for one hour and a range from 45% by weight to 35% by weight, preferably 40% by weight after completely immersed in water for six hours in the test method according to ASTM D6015, and a polymeric protection coat having a top coat and a cover coat. The protection coat is bonded on a grain surface of the low water absorption leather to retard the penetration of water and to protect the leather from damages. ASTM, as used herein, means American Society for Testing and Materials.

This outer leather layer is configured either in a sheet or a strip that is wrapped, adhered onto the lining sleeve, covering a sleeve body of the lining sleeve to form a water repellent leather grip.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

The present invention will be illustrated from FIGS. 4 to 24, wherein the same elements are represented with the same reference number.

Referring to FIGS. 5 to 10, a first embodiment of the present invention is a single sheet leather golf club grip 5 which is mountable onto the bigger butt end of the shaft. The single sheet leather grip 5 has a lining sleeve 7 as an inner layer, a single sheet leather layer 41 as an outer layer, and a seam strip 81 (shown in FIG. 5).

Figure 3:
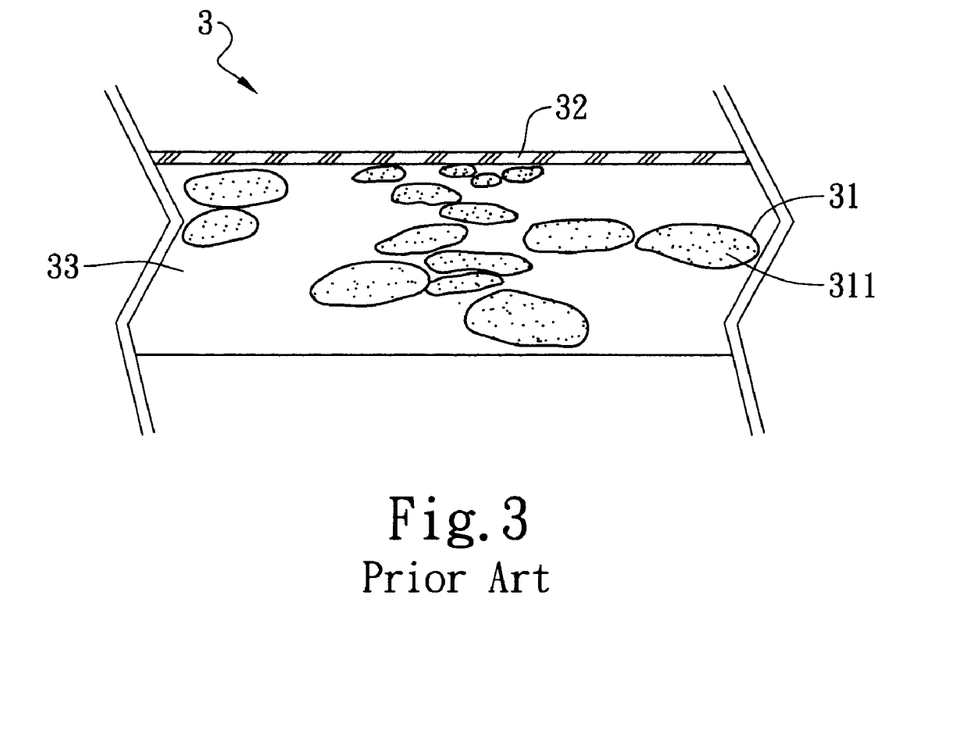
FIG. 3 is a cross sectional view of a conventional leather.

The outer sheet layer 41 is made out of a natural leather material 3 (shown in FIG. 3) which is the hide or skin of an animal put through a tanning process. The natural leather 3 includes cowhide, calf skin, deer skin, sheep skin, pig skin, fish skin, crocodile skin and other animal skins. Preferably, they are cowhide, calf skin, deer skin, sheep skin, and pig skin. The thickness of the natural leather 3 is about 0.6 mm to 2 mm, but preferably about 1.4 mm to 1.6 mm. The natural leather 3 is composed of natural collagen fiber bundles 31 and has a fiber thickness and degree of interweaving which changes continuously. The collagen fiber bundles 31 stereoscopic structure consists of single collagen fibers 311 that twist with each other in a dense gradient manner. The natural leather 3 includes a grain surface 32 as a surface layer and an inner reticular layer 33 as a base layer. The collage fiber bundles 31 tend to easily absorb the water and the natural oils in the natural leather 3 serve to lubricate the fiber bundles 31 and resist the penetration of water to keep the leather supple. These oils evaporate or are washed out over the usage times of the prior art golf club leather grips 1, 2. The fibers 311 in the natural leather of grips 1, 2 will become stiff and dry; and thus the natural leather of grips 1, 2 will become slick and hard after being in wet conditions. The solutions to these problems are to increase the surface tension between the fiber bundles 31 and the water by surrounding the fiber bundles 31 with a water repellent film in the leather substance which is a low water absorption crust leather 42 (hereafter called "the crust leather 42"). "Crust", used herein, means leather that has not been further processed after tanning but has been merely dried out.

Figure 4:
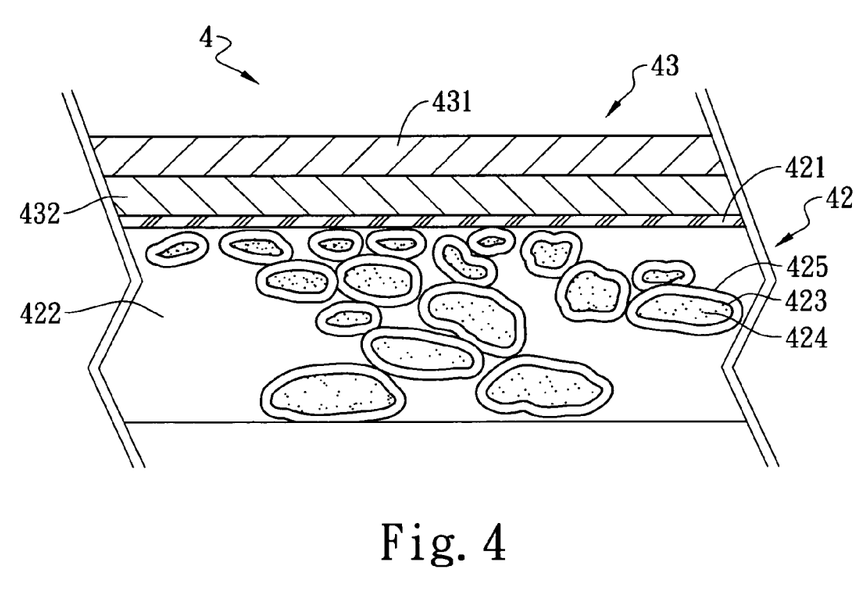
FIG. 4 is a cross sectional view of a coated leather.

Generally, one round of golf game takes about 5 to 6 hours. In consideration of this general golf club grip usage period in a golf game, the Applicants take one hour and six hours as the two defined periods for completely immersing tested leathers in water for a static water absorption test method according to ASTM D6015. Referring to FIG. 4, the Applicants discovered a combination of coated leather 4 that is an excellent water repellent leather material for the outer sheet layer 41 (mentioned later). This combination of coated leather 4 comprises the crust leather 42 that has a static water absorption that ranges from about 30% by weight to about 20% by weight, preferably about 26% by weight after completely immersed in water for one hour and ranges from about 45% by weight to about 35% by weight, preferably about 40% by weight after completely immersed in water for six hours in the test method according to ASTM D6015, and a polymeric protection coat 43, such as polyacrylate, polyurethane, or polybutadiene, being bonded to an outer grain surface 421 of the crust leather 42 which also has a reticular layer 422 as base layer (shown in FIG. 4).

Based upon the above two defined periods (one hour and six hours) of general golf club grip usage period in a game, the crust leather 42 (having a decreasing range of static water absorption of about 30% by weight after completely immersed in water for one hour and of about 45% by weight after completely immersed in water for six hours according to the test method mentioned above) will develop a sufficient water repellent film 425 that surrounds the fiber bundles 423 to prevent the fiber 424 inside the fiber bundles 423 from getting wet with the water. The natural oil in the crust leather 42 will therefore not be washed out and the crust leather 42 will be kept supple and not become slick and hard after being in wet conditions. When the crust leather 42 lowers its static water absorption range to less than 20% of the weight after completely immersed in water for one hour and less than 35% by weight after completely immersed in water for six hours according to ASTM D6015, the cost of the crust leather 42 is too high to be efficient for being used as a golf club grip leather. Furthermore, the protection coat 43 tends to easily deteriorate from the grain surface 421 of the crust leather 42 that has the static water absorption range less than 20% by weight after completely immersed in water for one hour and less than 35% by weight after completely immersed in water for six hours according to ASTM D6015. This will increase the defective products in the production.

The protection coat 43 is of about 0.08 mm to 0.15 mm in thickness, consisting of a top coat 431 and a cover coat 432. The cover coat 432 is formed from an Acrylic/polyurethane polymeric solution which penetrates deeply into the crust leather 42 to tighten the grain surface 421 and covers the imperfection of the crust leather to reduce the cost and to decrease the number of the defective products during production. The top coat 431 is bonded on top of the cover coat 432. The top coat 431 is made through a conventional manner with a main finishing material in a form of solution that applies formulations of thermoplastic binders based on polyacrylate, polyurethane, or polybutadiene. The protection coat 43 is a thin film that retards the penetration of water and protects the crust leather 42 from damages.

Owing to the above combination of the coated leather 4, in wet conditions it will have most of the water stay above or at the grain surface 421 of the crust leather 42. Therefore, the coated leather 4 will not become slick and hard after being in wet conditions. Also, because the water will quickly evaporate from the protection coat 43 into the open air, the coated leather 4 will have fast drying property which makes the coated leather 4 easy to clean and maintain, no susceptibility to mildew.

To make the combination of the coated leather 4, a natural leather is treated in a conventional water repellent treatment manner at the colouring stage of the tanning process. The natural leather is milled in a drum with the solution of Polysiloxanes resin to surround the fiber bundle 423 with a water repellent film 425, increasing the surface tension against water to form the crust leather 42 having a static water absorption that ranges from about 30% by weight to about 20% by weight after completely immersed in water for one hour and ranges from about 45% by weight to about 35% by weight after completely immersed in water for six hours in the test method according to ASTM D6015. Further at the finishing stage of the tanning process, an Acrylic/Polyurethane polymeric solution is sprayed by a spray machine (or, alternatively applied by roll coater or curtain coater) on the grain surface 421 of the crust leather 42 to form the cover coat 432. A solution, having formulations of thermoplastic polymer based on polyacrylate, polyurethane, or polybutadiene, is sprayed afterwards (or, alternatively applied by roll coater, or curtain coater) to form the top coat 431.

Figure 5:
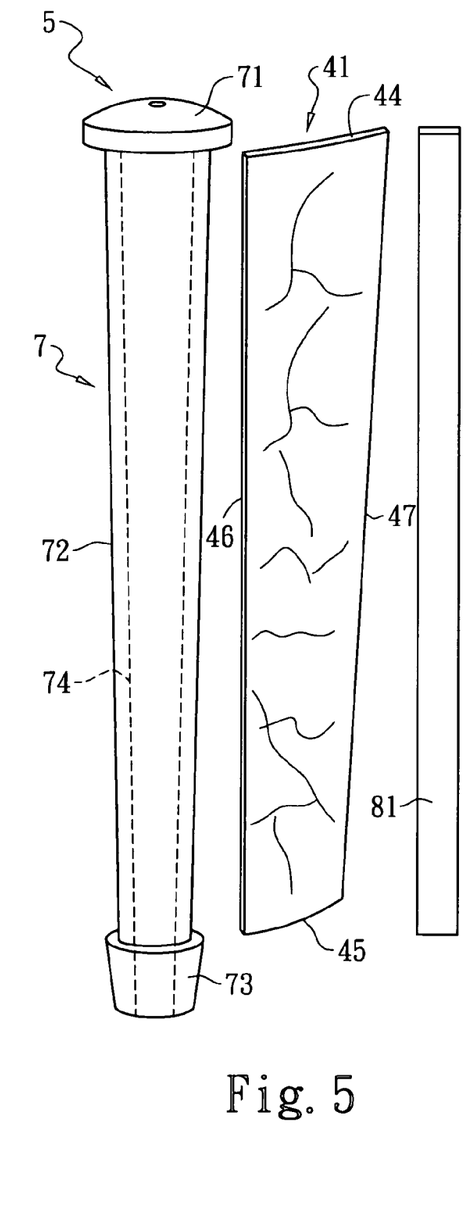
FIG. 5 is an exploded view of a first embodiment of the present invention.
Figure 6:
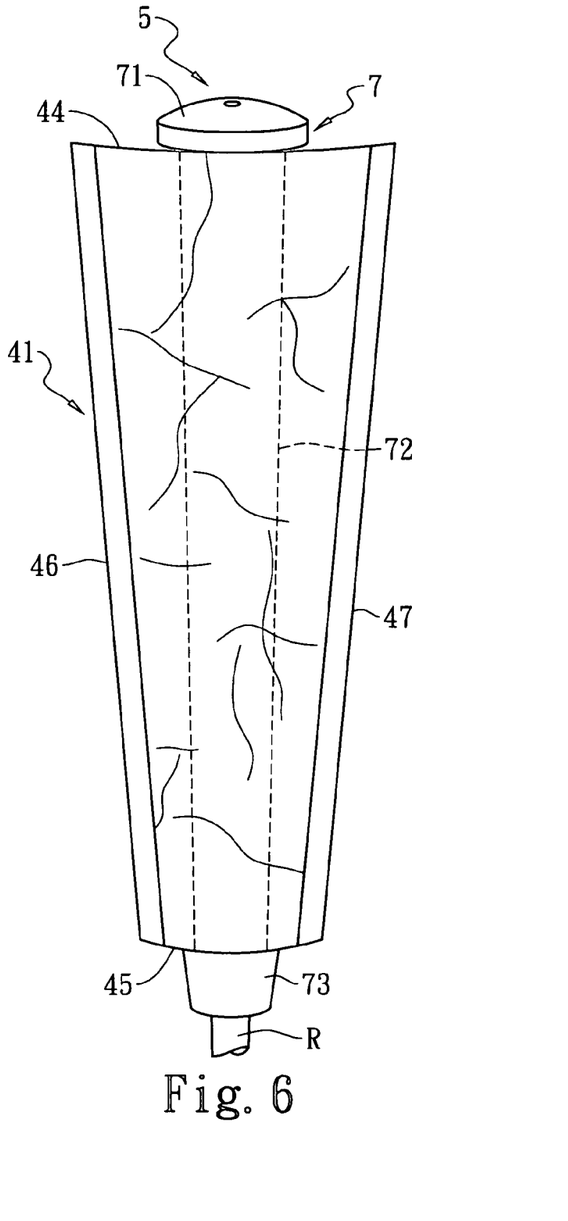
FIG. 6 is a front prospective view (from above) of a wrapping step of first embodiment's assembly process.
Figure 7:
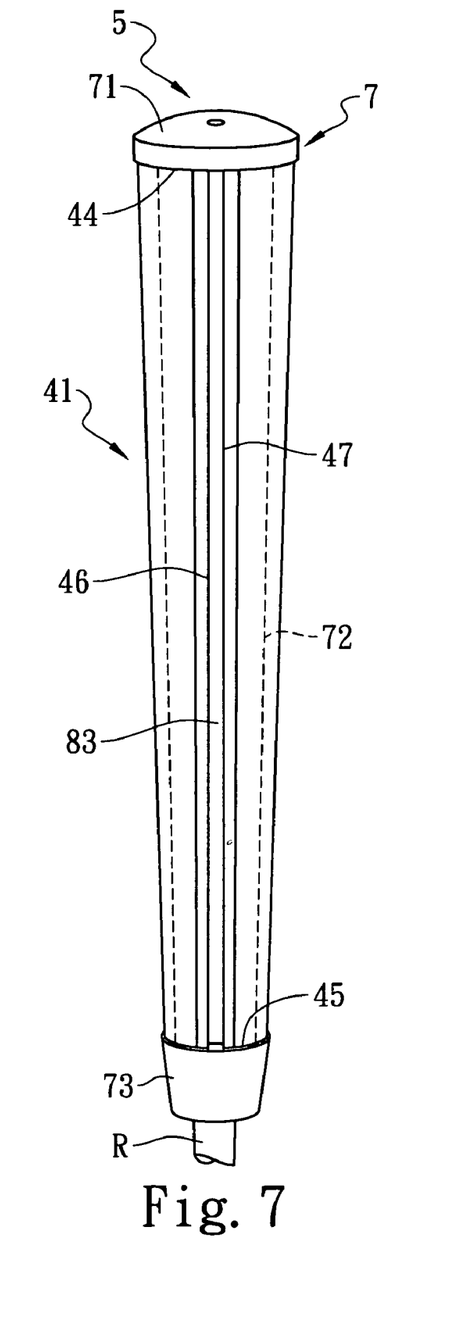
FIG. 7 is a back side prospective view (from above) of another wrapping step of first embodiment's assembly process.
Figure 8:
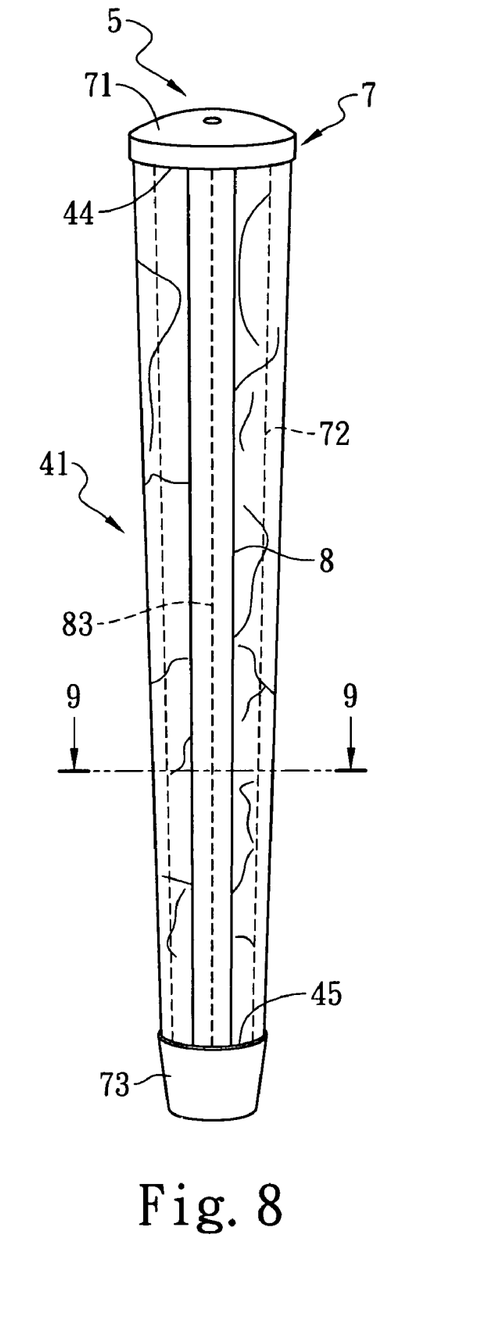
FIG. 8 is a prospective view of first embodiment of the present invention with an axial seam structure.

The lining sleeve 7 has an inner surface fitted around a golf club shaft and is made of resilient, expandable polymeric material such as natural rubber, rubber compound, thermoplastic elastomer (TPE), thermoplastic rubber (TPR), any suitable plastic, or closed-cell foams of plastic or rubber. The lining sleeve material is formed into a hollow tapered tubular body through a molding process. FIG. 5 also indicates that the lining sleeve 7 includes a sleeve body 72 which is circular in cross-section throughout its length, a cap 71 projecting radially from the larger top end of the sleeve body 72 and closed with a vent hole, a protective rim 73 projecting radially from smaller end tip of the sleeve body 72 with an opening, and a cavity 74 configured to receive the larger end of the golf club shaft.

Referring again to FIG. 5, the seam strip 81 can be selected from an elastic material group including Polyurethane, Vinyl, PVC, fabrics, textiles, and natural leathers. It is preferred that the seam strip 81 is natural leather. The seam strip 81 has a length extending from a top circumferential margin 44 to a bottom circumferential margin 45 of the outer sheet layer 41, a thickness of about 0.15 mm to 0.5 mm, and a width of about 3 mm to 6 mm. Preferably, the seam strip 81 has a thickness of about 0.4 mm and a width of about 4.5 mm.

The coated leather 4 is then die cut into a predetermined shape and dimension leather sheet material used as the outer sheet layer 41 (See FIG. 5). The outer sheet layer 41 has four margins 44, 45, 46, 47. Two long axial margins 46, 47 interconnect to the top circumferential margin 44 and the bottom circumferential margin 45 respectively. Two long axial margins 46, 47 can be edgily pressed to form L-shape corners (shown in FIG. 9). An inner surface dimension of the outer sheet layer 41 is longitudinally narrower than an outer surface dimension of the sleeve body 72 so that in the assembly an axial gap 83 can be formed between the two axial margins 46, 47 and the top circumferential margin 44 to the bottom circumferential margin 45 (shown in FIGS. 7 and 9).

In assembly, the lining sleeve 7 is mounted on a tapered rod R as a supportive base. A cement 76, such as that made from a polychroloprene polymer, is applied to the inner surface of the outer sheet layer 41's reticular layer 422 and the outer surface of the sleeve body 72 of the lining sleeve 7. As indicated in FIGS. 6 to 9, the outer sheet layer 41 is wrapped around and adhered onto the lining sleeve 7, covering the outer surface area of the sleeve body 72 in such a way that the two axial margins 46, 47 are facing each other to form a receiving groove 82 and an axial gap 83 from the top circumferential margin 44 to the bottom circumferential margin 45. The seam strip 81 is inset bonded onto each of the two axial margins 46, 47 within the receiving groove 82 and covers the axial gap 83, having a plurality of flat bonding surface 84 along each side of the axial gap 83 to make an axial seam structure 8 (shown in FIG. 9). The two axial margins 46, 47 are held by the axial seam structure 8 to form the first embodiment of the present invention—the single sheet water repellent leather grip 5.

Figure 9:
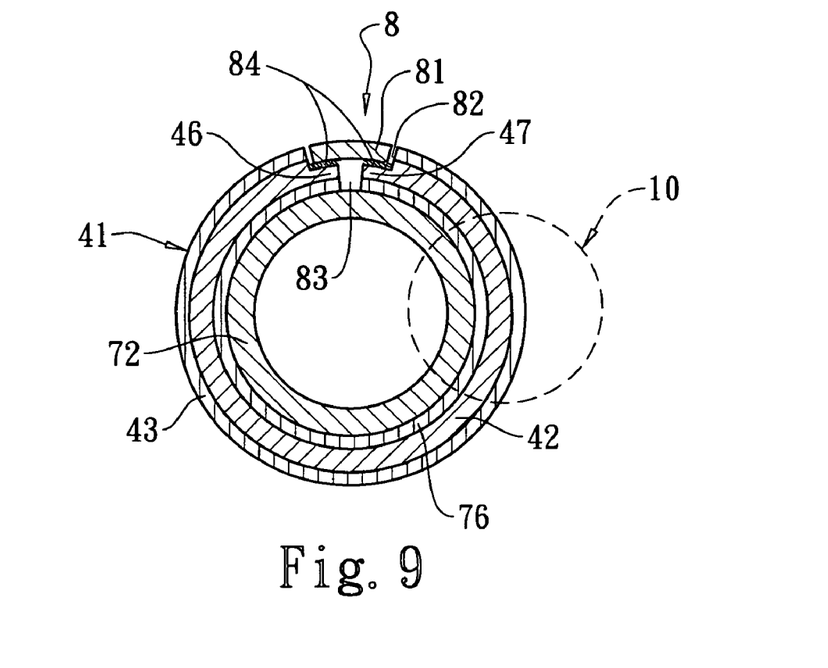
FIG. 9 is a cross sectional view on the line 9-9 of FIG. 8.
Figure 10:
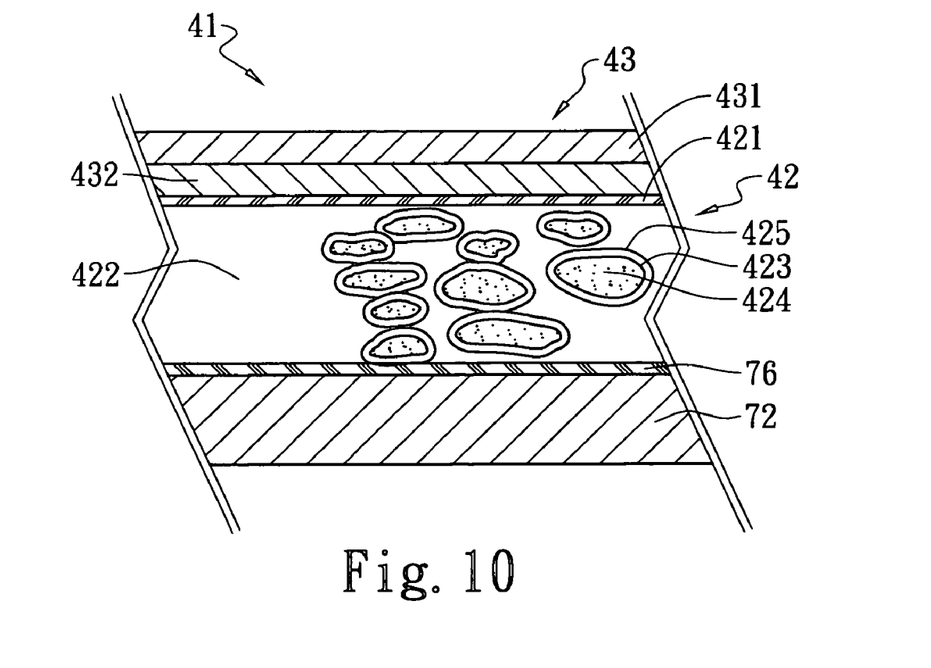
FIG. 10 is an enlarged view of encircled area designated 10 in FIG. 9.
Figure 11:
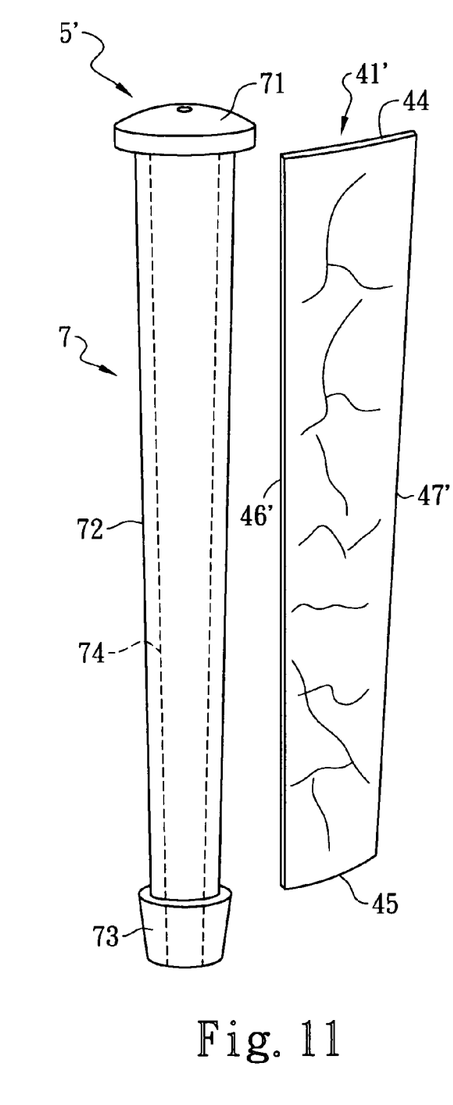
FIG. 11 is an exploded view of second embodiment of the present invention.

Referring to FIGS. 9 and 10, the single sheet leather grip 5 has the combination of the outer sheet layer 41 that includes the crust leather 42 and the protection coat 43. The crust leather 42, having a static water absorption range from about 30% by weight to about 20% by weight after completely immersed in water for one hour (preferably 26% by weight) and a range from about 45% by weight to about 35% by weight after completely immersed in water for six hours (preferably 40% by weight) according to the ASTM D6015 test method, will have a sufficient water repellent capability. The low water absorption is caused by the water repellent film 425 that surrounds the fiber bundles 423 to prevent the fibers 424 from getting wet and to also prevent the natural oils of the crust leather 42 from being washed out. Due to the low water absorption, the single sheet leather grip 5 will not become slick and hard after being in wet conditions. Furthermore, the crust leather 42 (with its range of static water absorption), is neither costly nor does it easily cause the deterioration of the protection coat 43 of the leather, which usually increases the rate of the defective products during production. The single sheet leather grip 5's cost efficiency and better production rate objects are thus accomplished.

The protection coat 43 is bonded to the grain surface 421 of the crust leather 42. As a result, since the protection coat 43 retards the penetration of the water plus the crust leather 42 is sufficiently water repellent treated, the single sheet leather grip 5 has a fast drying property which makes it easy to clean and with no susceptibility to mildew. Thus, the problems of mildew, the difficulty of cleaning and maintenance of the natural leather grips 1, 2 are solved. With the above mentioned features together, the first embodiment of the present invention—the single sheet leather grip 5 is a water repellent leather grip.

Figure 12:
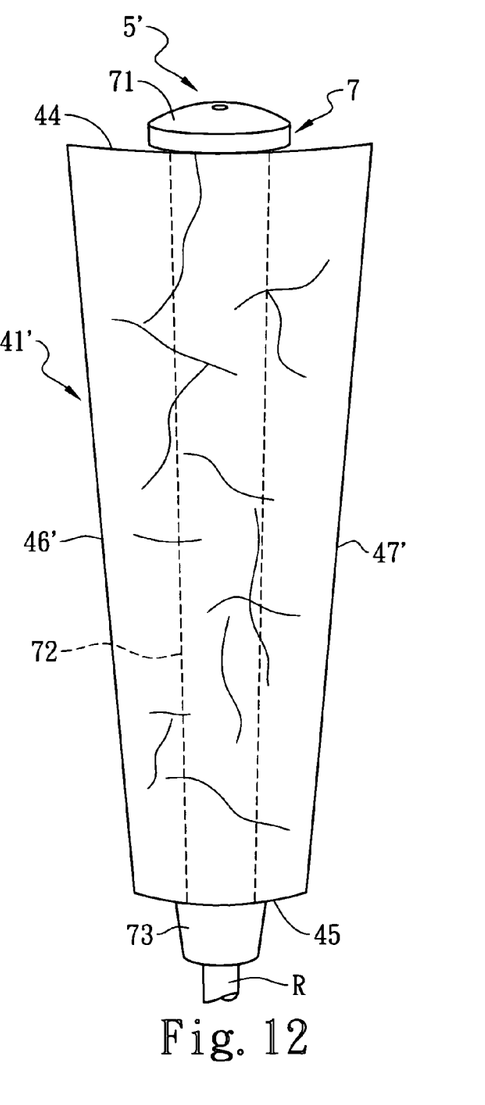
FIG. 12 is a front prospective view (from above) of a wrapping step of the second embodiment's assembly process.
Figures 13, 14:
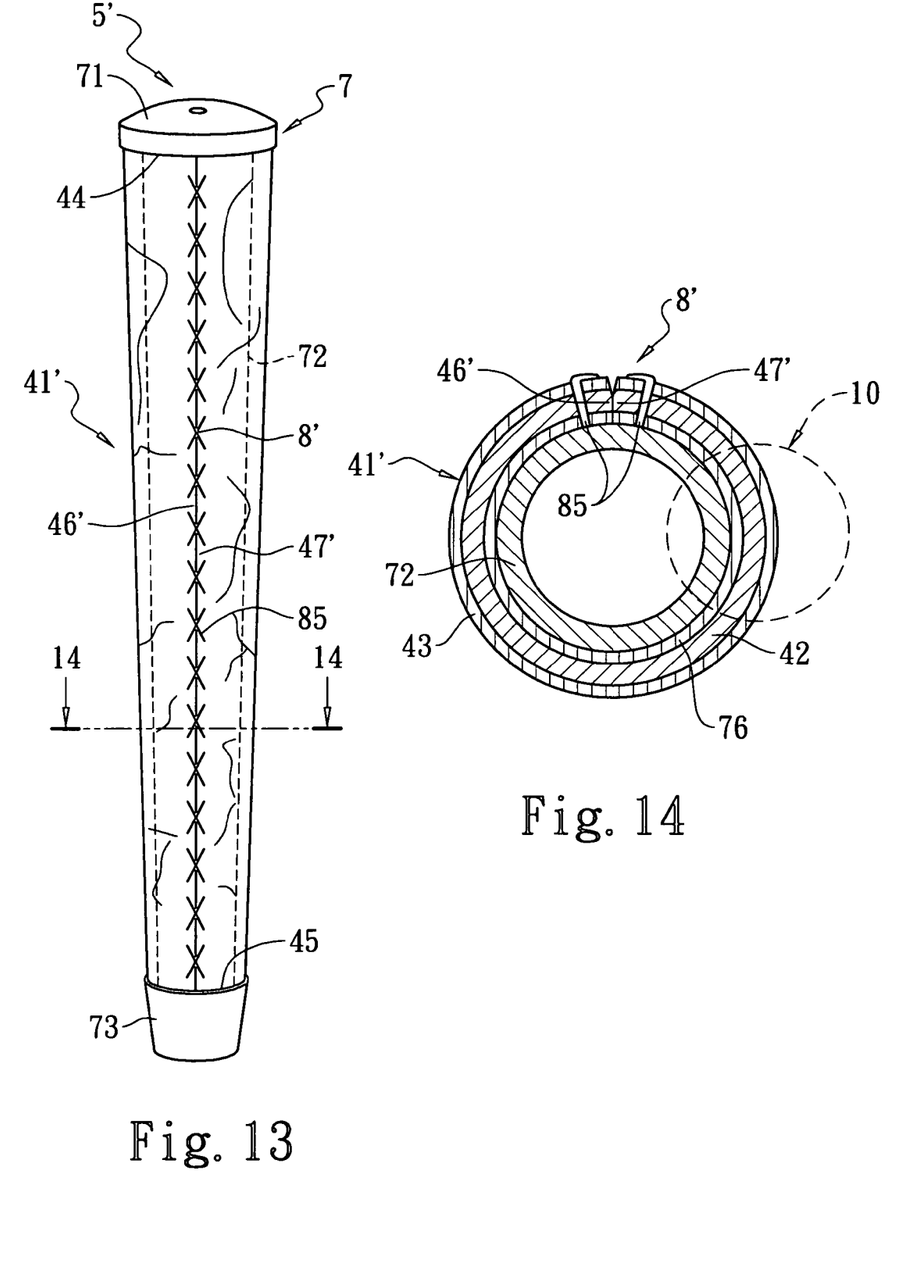
FIG. 13 is a prospective view of second embodiment of the present invention with a sewing type axial seam structure.
FIG. 14 is a cross sectional view on the line 14-14 of FIG. 13.
Figure 15:
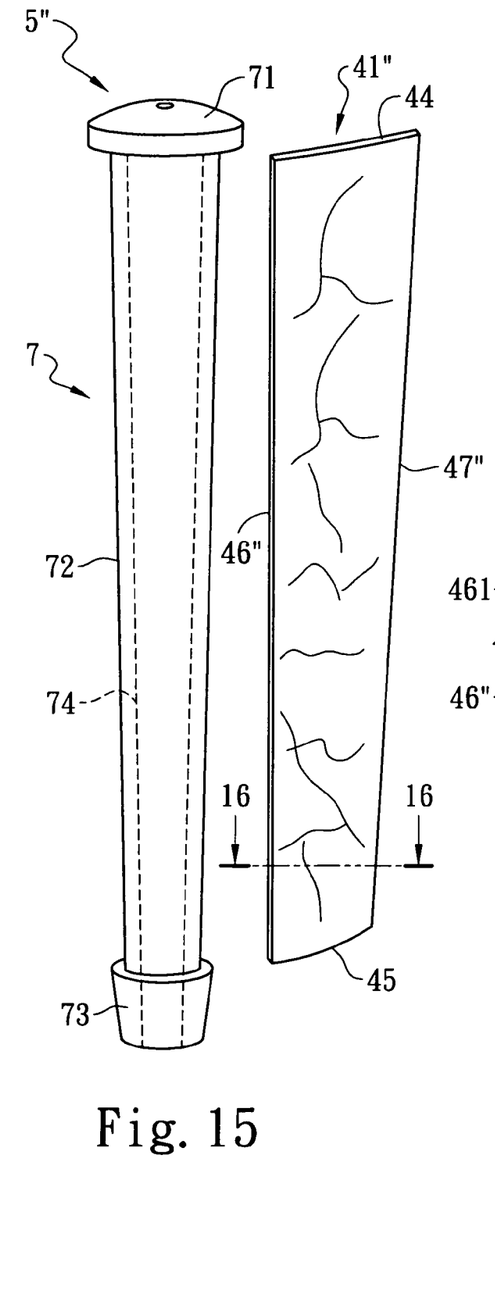
FIG. 15 is an exploded view of third embodiment of the present invention.

Referring to FIGS. 11 to 14, a second embodiment of the present invention—a single sheet leather grip 5' is similar to the construction of the first embodiment except that the second embodiment does not have the seam strip (shown in FIG. 11) and an outer sheet layer 41' does not have its two axial margins 46', 47' edgily pressed to form L-shape corners (shown in FIG. 14). The shape and dimension of outer sheet layer 41' corresponds to the whole outer surface area of the sleeve body 72.

In the assembly of the second embodiment, the lining sleeve 7 is mounted on a tapered rod R as a supportive base. A cement 76, such as that made from a polychroloprene polymer, is applied to the inner surface of the reticular layer 422 of the outer sheet layer 41' and the outer surface of the sleeve body 72 of the lining sleeve 7. As indicated in FIGS. 12, 13, 14, the outer sheet layer 41' is wrapped around and adhered onto the lining sleeve 7, covering the whole outer surface area of the sleeve body 72 in such a way that the two axial margins 46', 47' are brought together and sewn with a plurality of thread 85 as at 8' shown in FIG. 13 to make sewing type axial seam structure 8' from the top circumferential margin 44 to the bottom circumferential margin 45. The two axial margins 46', 47' are held together by the sewing type axial seam structure 8' to form the second embodiment of the present invention—the single sheet leather grip 5'.

Referring to FIGS. 14 and 10, the single sheet leather grip 5' has the outer sheet layer 41' which includes the same combination of the first embodiment's outer sheet layer 41 (shown in FIG. 10). The outer sheet layer 41' includes the same crust leather 42 and the same protection coat 43 which gives the grip 5' the same features of the first embodiment of the present invention to be a water repellent leather grip.

Figure 16:
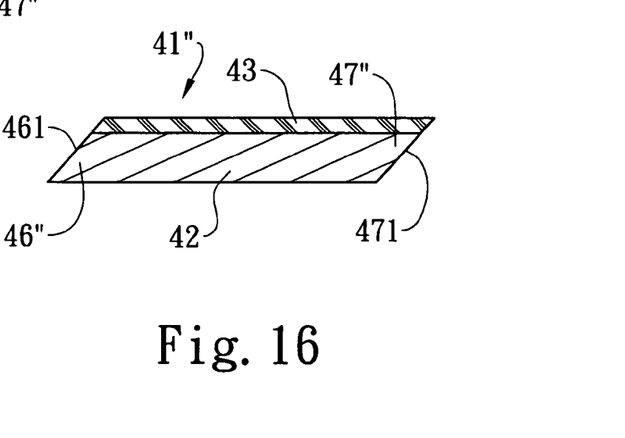
FIG. 16 is a cross sectional view of the line 16-16 of FIG. 15.

Referring to FIGS. 15 to 19, the third embodiment of the present invention—a single sheet leather grip 5" is similar to the construction of the first embodiment in exception that the third embodiment does not have the seam strip (shown in FIG. 15) and includes an outer sheet layer 41" having its two axial margins 46", 47" edgily skived or beveled on the opposite surface edges 461, 471 of these two axial margins 46", 47" (shown in FIG. 16). Both surface edges 461, 471 are contacted and adhered with each other so that a skived joint type axial seam structure 8" is formed (to be mentioned later). The shape and dimension of the outer sheet layer 41" corresponds to the whole outer surface area of the sleeve body 72.

Figure 17:
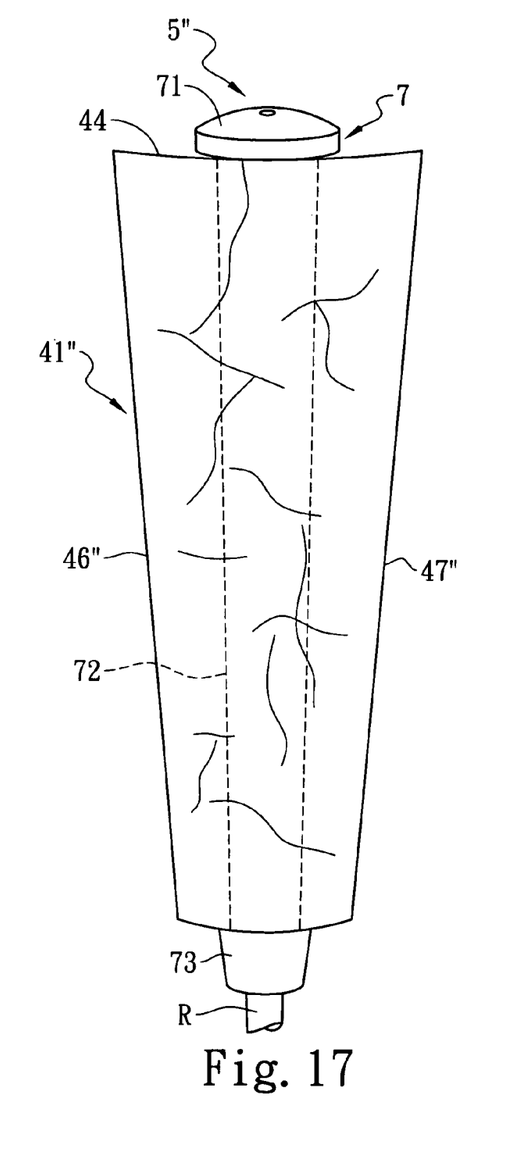
FIG. 17 is a front prospective view (from above) of a wrapping step of the third embodiment's assembly process.
Figure 18:
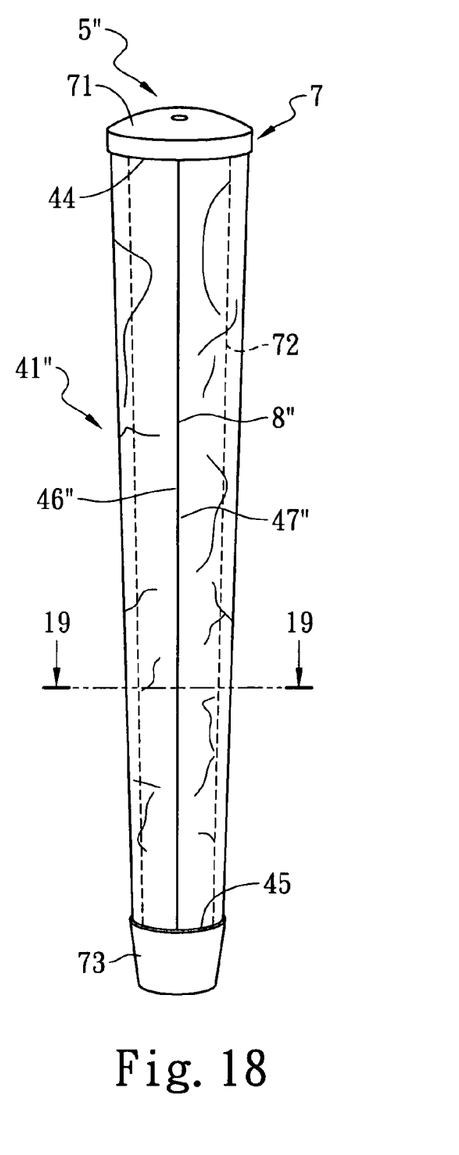
FIG. 18. is a prospective view of third embodiment of the present invention with a skived joint type axial seam structure.
Figure 19:
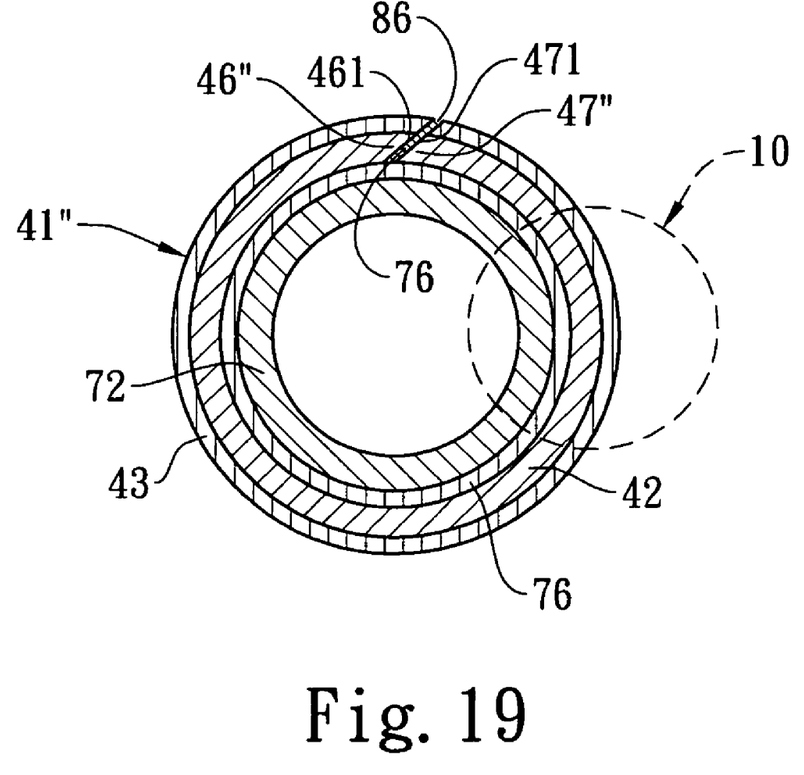
FIG. 19 is a cross sectional view on the line 19-19 of FIG. 18.

In the assembly of the third embodiment, the lining sleeve 7 is mounted on a tapered rod R as a supportive base. A cement 76, such as that made from a polychroloprene polymer, is applied to the inner surface of the reticular layer 422 of the outer sheet layer 41" and the outer surface of the sleeve body 72 of the lining sleeve 7. The cement 76 is also applied to the skived surfaces 461, 471 of two axial margins 46", 47". As indicated in FIGS. 17, 18, 19, the sheet layer 41" is wrapped around and adhered onto the lining sleeve 7, covering the whole outer surface area of the sleeve body 72. The two axial margins 46", 47" are contacted each other by adhering the two skived surface edges 461, 471 together to form a skived joint 86 at an axial seam structure 8". This axial seam structure 8" holds two axial margins 46", 47" from the top circumferential margin 44 to the bottom circumferential margin 45 to form the third embodiment of the present invention—the single sheet leather grip 5".

Referring to FIGS. 19 and 10, the single sheet leather grip 5" has the outer sheet layer 41" which includes the same combination of the first embodiment's outer sheet layer 41 (shown in FIG. 10). The outer sheet layer 41" includes the same crust leather 42 and the same protection coat 43 which give the single sheet leather grip 5" the same features of the first embodiment of the present invention to be a water repellent leather grip.

Referring to FIGS. 20-24, a fourth embodiment of the present invention—a strip leather grip 6 includes an elongated leather strip 48 as outer layer and a lining sleeve 7' as inner layer. The coated leather 4 is die cut into the leather strip 48 that is an elongated strip which has a slanted leading tip 481 at starting end and another slanted tip 482 at opposite end (shown in FIG. 20). The dimension and length of the outer leather strip 48 is determined such that the outer leather strip 48 covers the whole outer surface area of the sleeve body 72.

Figure 20:
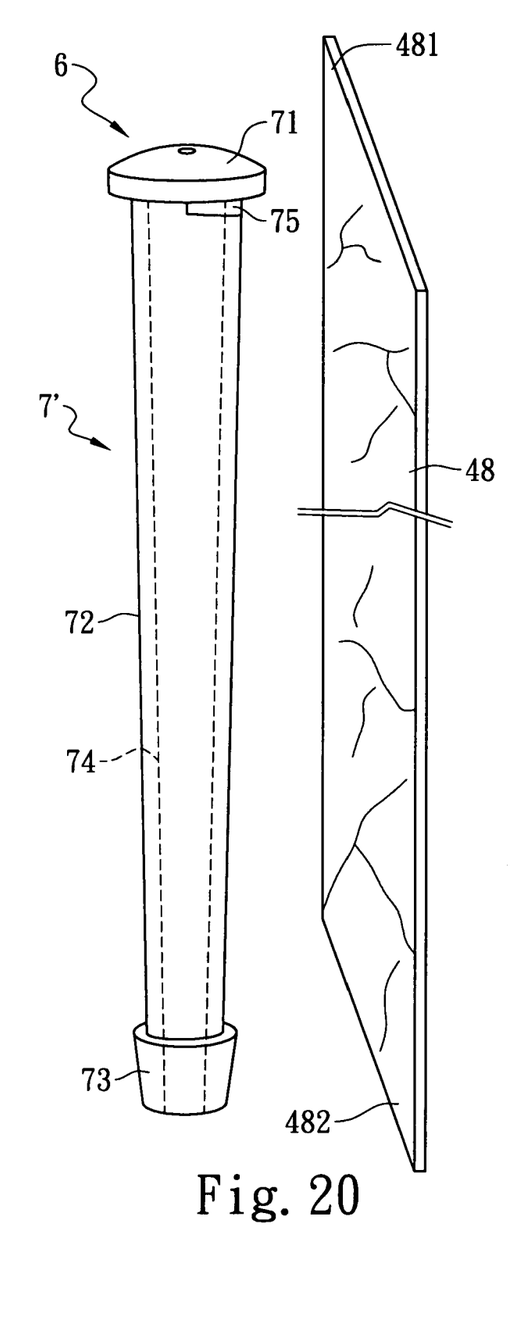
FIG. 20 is an exploded view of the fourth embodiment of the present invention.

As indicated in FIG. 20, the lining sleeve 7' is similar to the construction of the lining sleeve 7 except that a recess 75 is molded on the sleeve body 72 at the underside of the cap 71.

Figure 21:
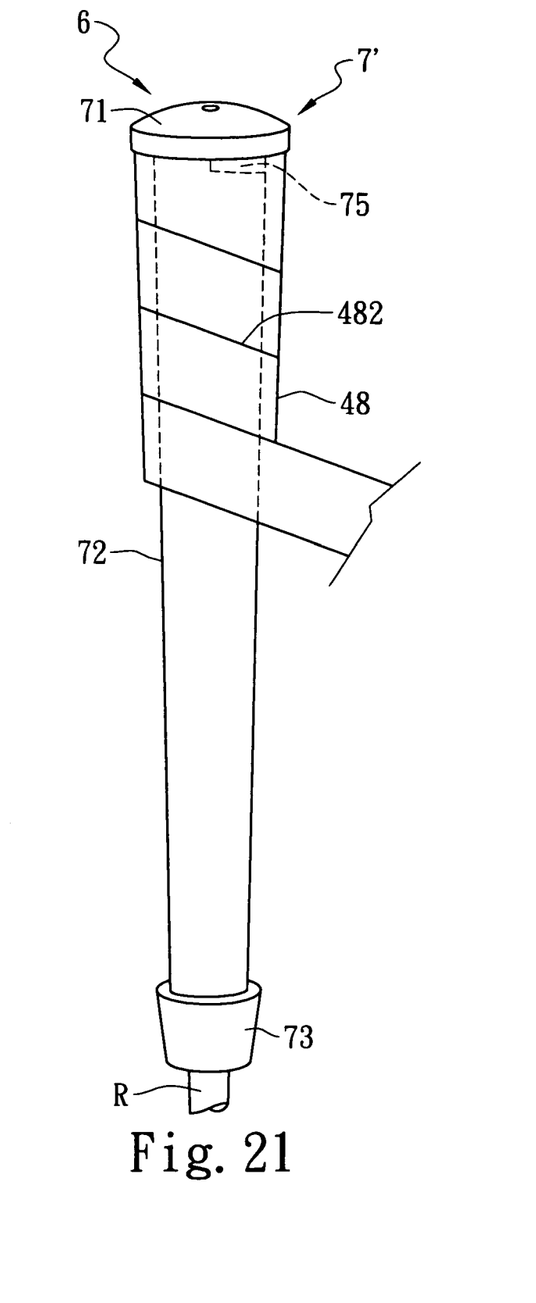
FIG. 21 is a front prospective view (from above) of a spiral wrapping step of fourth embodiment's assembly process.
Figure 22:
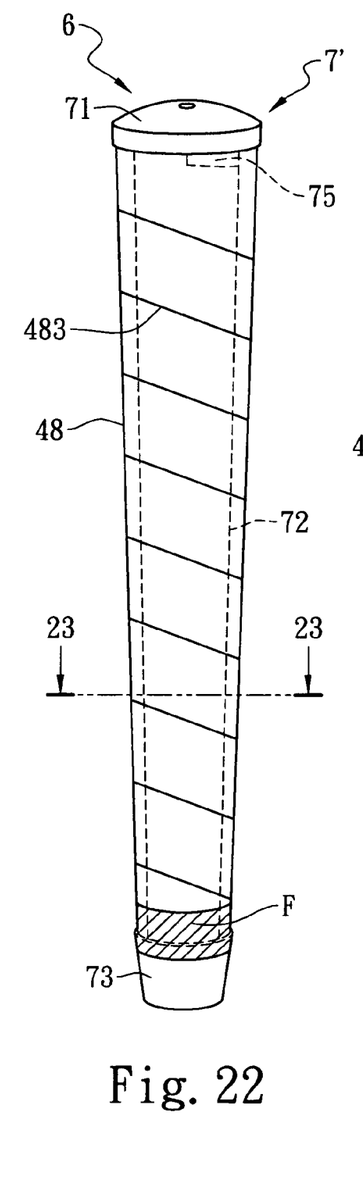
FIG. 22 is a prospective view of fourth embodiment of the present invention.

Referring to FIGS. 21 and 22, the slanted leading tip 481 is received in the recess 75 of the lining sleeve 7' to start winding. The outer strip layer 48 is spirally wrapped about the sleeve body 72 of the lining sleeve 7' in such a way that the side edges of the outer strip layer 48 are in tight abutment at 483 to cover the whole outer surface area of the sleeve body 72. After the outer strip layer 48 has finished winding at the edge of protective rim 73 of the lining sleeve 7', the end tip 482 of the outer strip layer 48 can be secured in the place adjacent to the protective rim with a finish tape F or rubber band or the like to form the fourth embodiment of the present invention.

Figure 23:
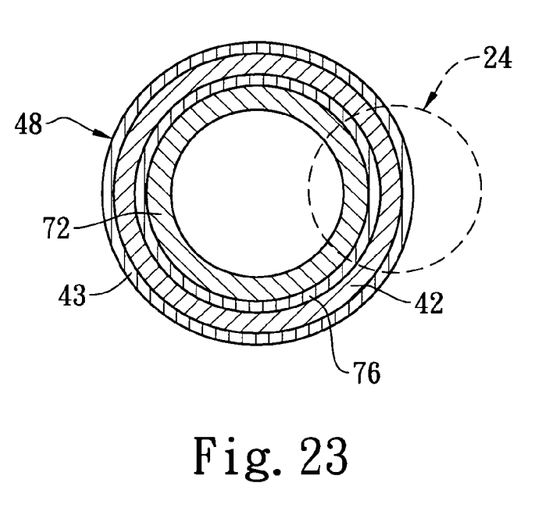
FIG. 23 is a cross sectional view on the line 23-23 of FIG. 22.
Figure 24:
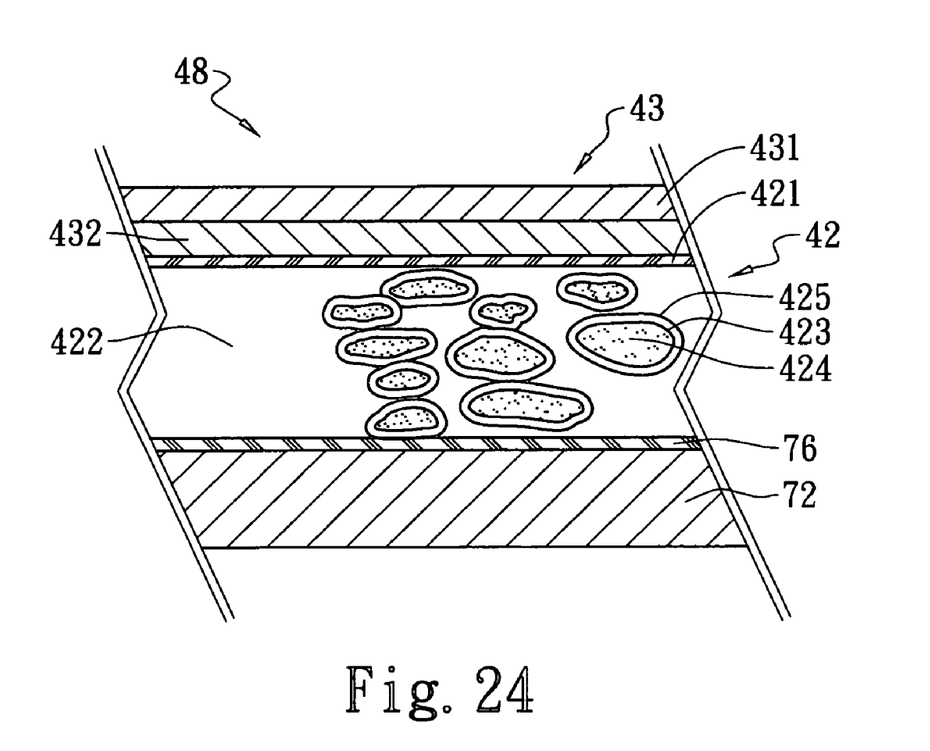
FIG. 24 is an enlarged view of encircled area designated 24 in FIG. 23.

Referring to FIGS. 23 and 24, the strip leather grip 6 has the outer strip layer 48 which includes the same combination of the first embodiment's outer sheet layer 41 (shown in FIGS. 10, 24). The outer strip layer 48 includes the same crust leather 42 and the same protection coat 43 which gives the grip 6 the same features of the first embodiment of the present invention to be a water repellent leather grip.

It should be noted that in the above first to fourth embodiment the leather grips could all be modified into a putter grip. This modification is done by changing the lining sleeve 7, 7' to a different lining sleeve which has a non-circular cross-sectional sleeve body with a flat front area (not shown). The configuration of the flat front area is in accordance with the design of most putters in general use.

The present invention has been described in connection with what are considered the most practical and preferred embodiments. It is understood that this invention is not limited to the disclosed embodiments but is intended to cover various arrangements included within the spirit and scope of the broadest interpretation so as to encompass all such modifications and equivalent arrangements.

We claim:

1. A golf club grip, comprising:
    a lining sleeve, which includes a sleeve body having top and bottom ends, a cap projecting radially from said top end, a protective rim projecting radially from said bottom end, and a cavity configured to receive a larger end of a golf club shaft; and
    a single natural leather sheet, which includes a low water absorption leather and a polymeric protection coat,
    wherein said low water absorption leather has a grain surface and a reticular layer,
    wherein said lower water absorption leather has a static water absorption range from 30% by weight to 20% by weight after completely immersed in water for one hour and from 45% by weight to 35% by weight after completely immersed in water for six hours,
    wherein said protection coat is bonded to said grain surface of said low water absorption leather,
    wherein said single natural leather sheet has four margins: two axial margins including a top circumferential margin and a bottom circumferential margin; said two axial margins respectively interconnect to said top and bottom circumferential margins,
    wherein a dimension of said single natural leather sheet together with an axial seam structure from said top circumferential margin to said bottom circumferential margin can cover the whole outer surface of said sleeve body of said lining sleeve,
    wherein said single natural leather sheet is wrapped around and adhered onto the lining sleeve, and
    wherein said two axial margins of said single natural leather sheet are held together by means of said axial seam structure from said top circumferential margin to said bottom circumferential margin.

2. The golf club grip as claimed in claim 1, wherein said lining sleeve is made of rubber, rubber compounds, thermoplastic elastomer (TPE), thermoplastic rubber (TPR), elastomers, or closed-cell foams of plastics or rubbers.

3. The golf club grip as claimed in claim 1, wherein said single natural leather sheet is a material through a tanning process.

4. The golf club grip as claimed in claim 3, wherein said single natural leather sheet is selected from a group consisting of cowhide, calf skin, deer skin, sheep skin, pig skin, crocodile skin, and fish skin.

5. The golf club grip as claimed in claim 3, wherein said single natural leather sheet has a thickness of about 0.6 mm to 2 mm.

6. The golf club grip as claimed in claim 5, wherein said single natural leather sheet has a thickness of about 1.4 mm to 1.6 mm.

7. The golf club grip as claimed in claim 1, wherein said low water absorption leather is a crust leather which has not been further processed after tanning but has been merely dried out.

8. The golf club grip as claimed in claim 1, wherein said low water absorption leather is made through a process of milling in a drum with a solution of Polysiloxane resin at the colouring stage of said tanning process.

9. The golf club grip as claimed in claim 1,
    wherein said protection coat includes a top coat and a cover coat,
    wherein said cover coat is bonded on said grain surface of said low water absorption leather,
    wherein said top coat is bonded on said cover coat,
    wherein said protection coat has a thickness of about 0.08 mm to 0.15 mm, and
    whereby said protection coat retards the penetration of water into said low water absorption leather and protects said low water absorption leather from damages.

10. The golf club grip as claimed in claim 9, wherein said top coat is made of thermoplastic polymers based on polyarcylate, polyurethane or polybutadiene.

11. The golf club grip as claimed in claim 9, wherein said cover coat is made of an Acrylic/Polyurethane polymeric solution.

12. The golf club grip as claimed in claim 1,
wherein an inner surface dimension of said single natural leather sheet is longitudinally narrower than an outer surface dimension of said sleeve body,
wherein said two axial margins of said single natural leather sheet are edgily pressed to form L-shaped corners toward each other to form an axial gap between said two axial margins and said top circumferential margin to said bottom circumferential margin,
wherein an receiving groove is formed between said L-shaped corners of said two axial margins and said top circumferential margin to said bottom circumferential margin,
wherein said axial seam structure has a seam strip, covering said axial gap and inset bonded onto each of the two axial margins within said receiving groove, and
wherein said seam strip has a plurality of flat bonding surfaces that adhere with each of the two axial margins along each side of said axial gap.

13. The golf club grip as claimed in claim 1,
wherein an inner surface's shape and dimension of said single natural leather sheet corresponds to an outer surface's shape and dimension of said sleeve body of said lining sleeve, and
wherein said two axial margins of said single sheet are brought together and sewn by means of a plurality of threads to finish (said) said axial seam structure from said top circumferential margin to said bottom circumferential margin.

14. The golf club grip as claimed in claim 1,
wherein a plurality of opposite surface edges of said single natural leather sheet's two axial margins are edgily skived,
wherein an inner surface's shape and a dimension of said single natural leather sheet corresponds to an outer surface's shape and dimension of said lining sleeve's sleeve body, and
wherein said skived edge surfaces of said two axial margins are contacted and adhered with each other, forming a skived joint to finish (said) said axial seam structure from said top circumferential margin to said bottom circumferential margin.

15. A method of making a grip for the handle of a golf club, comprising steps of:
providing a lining sleeve, which includes a sleeve body having top and bottom ends, a cap projecting radially from said top end, a protective rim projecting radially from said bottom end, and a cavity configured to receive a larger end of a golf club shaft,
providing a single natural leather sheet, which includes a low water absorption leather and a polymeric protection coat,
wherein said low water absorption leather has a grain surface and a reticular layer,
wherein said lower water absorption leather has a static water absorption range from 30% by weight to 20% by weight after completely immersed in water for one hour and from 45 by weight to 35% by weight after completely immersed in water for six hours,
wherein said protection coat is bonded to said grain surface of said low water absorption leather,
wherein said single natural leather sheet has four margins: two axial margins, a top circumferential margin, and a bottom circumferential margin, and said two axial margins respectively interconnect to said top and bottom circumferential margins,
providing a dimension of said single sheet together with an axial seam structure from said top circumferential margin to said bottom circumferential margin can cover the whole outer surface of said sleeve body of said lining sleeve,
wrapping around said single natural leather sheet and adhering said single natural leather sheet onto said lining sleeve,
holding said two axial margins of said single natural leather sheet together by means of said axial seam structure from said top circumferential margin to said bottom circumferential margin.

16. The method as claimed in claim 15, wherein said single sheet has a thickness of about 0.6 mm to 2 mm.

17. The method as claimed in claim 16, wherein said single sheet has a thickness of about 1.4 mm to 1.6 mm.

18. The method as claimed in claim 15, wherein said low water absorption leather is a crust leather which has not been further processed after tanning but has been merely dried out.

19. The method as claimed in claim 15, wherein said low water absorption leather is made through a process of milling in a drum with a solution of Polysiloxanes resin at the colouring stage of said tanning process.

20. The method as claimed in claim 15,
wherein said protection coat includes a top coat and a cover coat,
wherein said cover coat is bonded on said grain surface of said low water absorption leather,
wherein said top coat is bonded on said cover coat,
wherein said protection coat has a thickness of about 0.08 mm to 0.15 mm, and
whereby said protection coat retards the penetration of water into said low water absorption leather and protects said low water absorption leather from damages that include abrasions.

21. The method as claimed in claim 20, wherein said top coat is made of thermoplastic polymers based on polyarcylate, polyurethane or polybutadiene.

22. The method as claimed in claim 20, wherein said cover coat is made of an Acrylic/Polyurethane polymeric solution.

* * * * *